United States Patent [19]

Krnac

[11] Patent Number: 4,525,122
[45] Date of Patent: Jun. 25, 1985

[54] WIND-POWERED MACHINE

[76] Inventor: Ondrej Krnac, 311 Dixon Rd. No. 1007, Weston, Ontario, Canada, M9R 1S3

[21] Appl. No.: 514,867

[22] Filed: Jul. 18, 1983

[51] Int. Cl.³ ............................................... F03D 5/06
[52] U.S. Cl. .......................................... 416/80; 416/82
[58] Field of Search .................. 416/79, 80, 82, 83; 166/75 R; 52/116, 120; 417/332

[56] References Cited

U.S. PATENT DOCUMENTS

| | | | |
|---|---|---|---|
| 258,826 | 5/1882 | Trumble | 416/80 |
| 635,390 | 10/1899 | Rehart | 417/332 |
| 1,221,090 | 4/1917 | Prewitt et al. | 416/41 |
| 1,281,618 | 10/1918 | McGregor | 416/82 |
| 1,447,455 | 3/1923 | Wold | 416/80 |
| 2,465,285 | 3/1949 | Schwickerath | 416/41 R |

Primary Examiner—Robert E. Garrett
Assistant Examiner—H. Edward

[57] ABSTRACT

A wind-powered machine is provided in which a vane is driven through a vertical or horizontal arc with a back and forth motion, the motion of the vane serves to actuate a power generating mechanism, in the case where the vane moves in a vertical arc the actuation of the power generating mechanism can be achieved without any translation of the direction of the power transmission system; a governing mechanism serves to vary the response of the vane relative to the wind velocity.

7 Claims, 7 Drawing Figures

4,525,122

WIND-POWERED MACHINE

BACKGROUND OF THE INVENTION (a) Field of the Invention

This invention relates to wind-operated power sources.

(b) Description of Prior Art

With the increased interest in alternative sources of energy, which has been occasioned by depleting oil resources and enhanced oil prices, attention has been directed to wind and solar energy.

Solar energy has limited applications in temperate climate zones, whereas wind is universal.

The use of wind as a source of energy has had two main drawbacks: the difficulty in controlling the response of the wind-operated machine, and the large size of the machine required.

The speed and velocity of the wind are, of course, uncontrollable, and in the absence of a governing mechanism there is no machine which can withstand the stress of the more violent winds. Even the governing mechanisms of present wind-operated machines are incapable of successfully withstanding windforces greater than 40 knots.

There are two principal types of wind-machine: the traditional windmill having a vane structure which rotates about a horizontal axis, and the more recently developed helical vane which rotates about a vertical axis.

With the traditional windmill the vane area required to generate power is very large, as a consequence the supporting structure and construction expense of non-power generating facilities is relatively large. For example, to provide a vane area of nine square meters, an 80 foot tower is required.

Wind machines employing vanes with a helical structure are, due to the nature of the structure, difficult to govern, and in the absence of some form of governing mechanism will, under high winds, self-destruct.

Both of these prior wind-machines have, in common, one feature which reduces their efficiency, namely in both structures power generated has to be translated at least through 90 degrees, from a vertical to a horizontal axis with a consequent loss of efficiency.

SUMMARY OF THE INVENTION

In accordance with the invention there is provided a wind power-generating machine comprising a support structure, a vane support arm having a vane pivotally mounted thereon, said support arm being rotatably mounted on said support structure about a first axis for alignment of said vane relative to the wind direction, and pivotally mounted, relative to said support structure, for arcuate travel about a second axis perpendicular to said first axis responsive to wind pressure on said vane, means for reversing the direction of arcuate travel of said vane and support arm, and power actuating means connected to said support arm, adapted to be reciprocated responsive to reversing arcuate travel of said vane and support arm.

The pivotal mounting of the support arm may but such that the arcuate travel is in an up and down motion about a horizontal axis or in a to and fro motion about a vertical axis.

In a particular embodiment of the invention there is provided a wind power-generating machine which comprises: at least one vane; vane support means; tower means for supporting said vane support means; and power actuating means reciprocally movable in response to movement of said vane; said vane being reversibly pivotally mounted on said vane supporting means adjacent a first end thereof for movement about a substantially horizontal axis through a predetermined arc; said vane support means being rotatably mounted on said tower means for first movement about a horizontal axis through a predetermined arc in response to vertical movement of said vane and in a second direction about a vertical axis in response to horizontal movement of said vane; means for reversing the direction of travel of said vane; and governor means for controlling movement of said vane.

In particular the governor means includes a movable governor vane and means responsive to movement of the governor vane to control the period of the vane arc and to stop the machine during high winds such as occurs in a storm. This represents an important safety feature.

With the present invention a vane, which moves about a horizontal axis, is provided so that there is no translational inefficiency.

There is also the further advantage that with the present structure the speed of vane is self-governing and the attitude varies in accordance with wind velocity.

BRIEF DESCRIPTION OF DRAWINGS

The invention will be more fully understood from the following description and drawings in which one particular embodiment is described by way of example, and in which.

Figure 1:
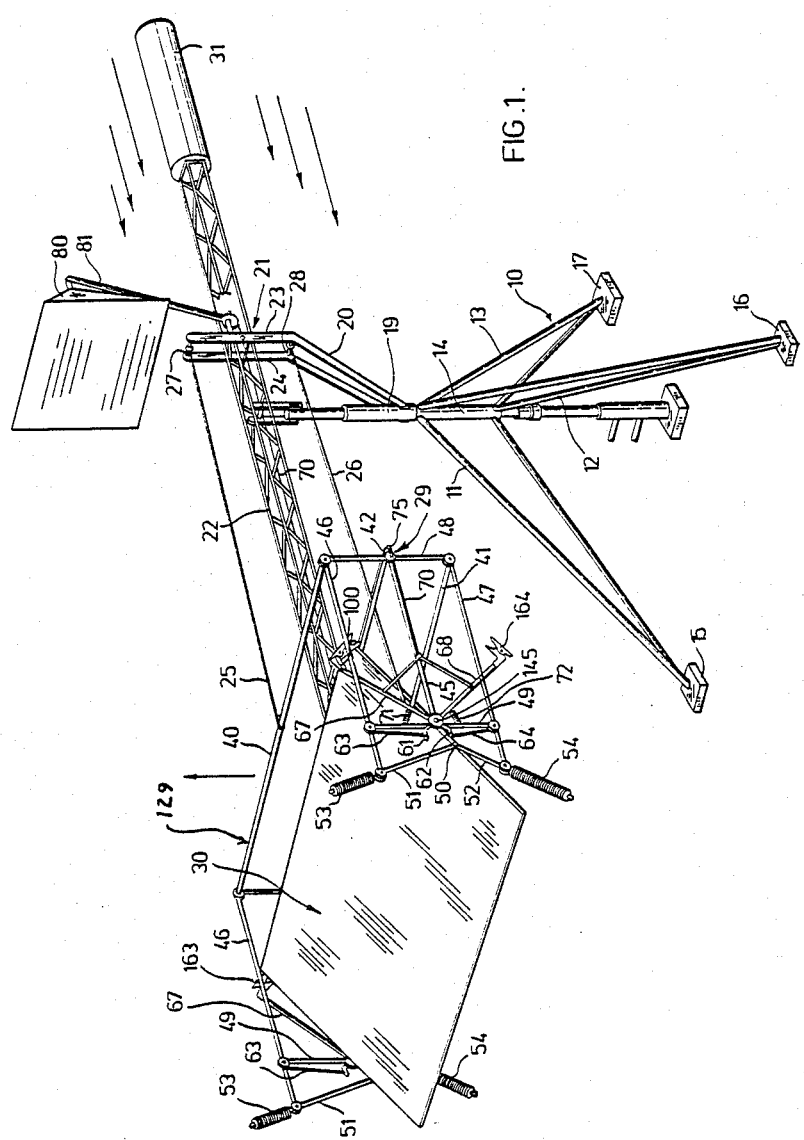
FIG. 1 is a perspective showing a wind-powered machine in accordance with the present invention.

DESCRIPTION OF PREFERRED EMBODIMENTS WITH REFERENCE TO THE DRAWINGS:

With further reference to FIG. 1, a wind-powered machine A comprises a vane 30, a vane-supporting structure 21, a counterweight 31 and a governing vane 80 mounted on a tower 10.

Tower 10 has three equiradial legs 11, 12 and 13 secured adjacent their upper ends to a vertical support tube 14 and at their lower ends to concrete pads 15, 16 and 17 which suitably may be embedded in the ground.

Vane-supporting structure 21 comprises an elongate arm 22, a collar 19, an upper cable 25 and a lower cable 26.

Collar 19 is rotatably mounted with suitable bearings (not shown) about the upper end of vertical support tube 14. A pair of arms 20 mounted on opposite sides of collar 19 and terminate in generally vertical, spaced apart arms 23 and 24. Spaced apart rods 27 and 28 extend between the upper and lower ends of arms 23 and 24, respectively.

Elongate arm 22, which suitably is of truss structure for lightness, is pivotally mounted about pivot shaft 121, between arms 23 and 24 for arcuate up and down motion; cable 25 is connected at one end to rod 27 and cable 26 is connected at one end to rod 28.

A vane-supporting frame 29 is mounted on one end of elongate arm 22 and the counterweight 31 is mounted at the other end to balance arm 22 in a normal rest position.

Frame 29 supports vane 30, pivotally mounted for rotation on a shaft 145 which corresponds with the principal axis of vane 30 and lies in the same plane as the arm 22.

Alternatively, the principal axis of vane 30 may be above or below the pivot shaft 121.

A lateral finger 100 extends from each side of vane 30.

Vane-supporting frame 29 comprises a rear rod 42 solidly connected to a pair of opposed lateral rods 45.

Figure 6:
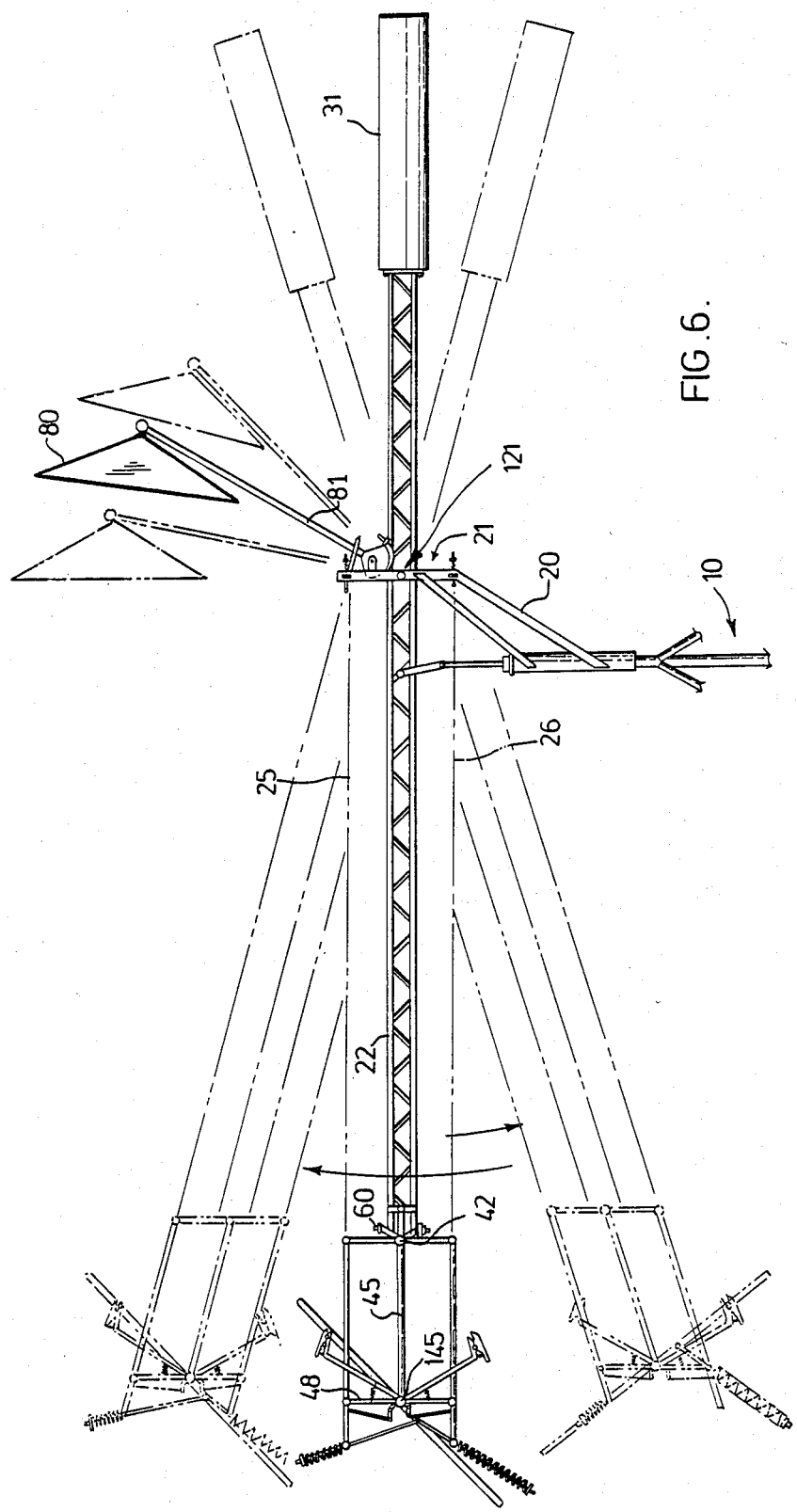
FIG. 6 is a schematic view showing in dotted outline the various attitudes of different components in different attitudes and serves to illustrate the mode of operation of the machine of FIG. 1.

A vertical frame 129 is mounted around vane 30 for pivotal movement relative to frame 29. It is necessary that frame 129 maintain its vertical configuration in different positions, as shown in FIG. 6.

Vane supporting frame 129 is of generally rectangular form and comprises a rear frame wall and a pair of opposed lateral frame walls.

The rear frame wall comprises an upper rod 40 and a lower rod 41 in parallel spaced apart relationship with each other and with rod 42 of frame 29. Rods 40 and 41 are connected at their ends by vertical rods 48.

Each lateral frame wall comprises an upper rod 46 and a lower rod 47, in parallel, spaced apart relationship with each other and rod 45 of frame 29; and a generally vertical rod 49.

Rods 46 and 47 are pivotally mounted relative to vertical rods 48 and 49. This permits movement of the frame 129 to assume the configurations more particularly shown in FIG. 6, while retaining rods 48 and 49 vertical.

Cables 25 and 26 are connected to frame 129 at rods 40 and 41 respectively.

Frame 29 is mounted on elongate arm 22 by bracket 60 which is connected to rod 42.

Vane 30 includes a shaft 50 connected to upper and lower arms 51 and 52, one pair on each side. Arms 51 and 52, in turn, are slideably mounted under the action of springs 53 and 54, respectively, relative to rods 46 and 47 of frame 129.

The ends of arms 51 and 52 are threaded and provided with nuts to adjust the spring tension.

Figure 2:
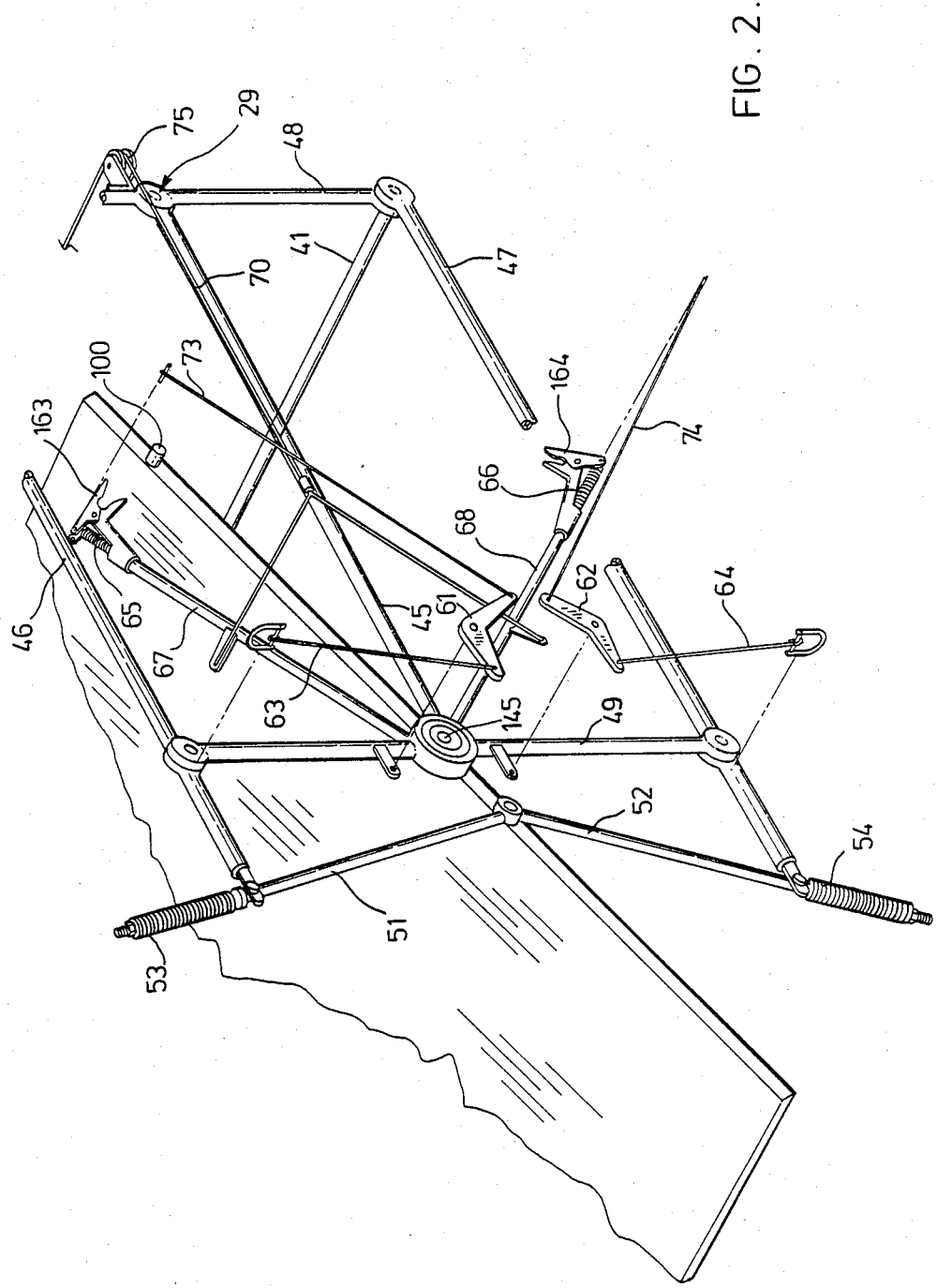
FIG. 2 is an enlarged view partially exploded of one side of a vane frame structure employed in the machine of FIG. 1.

Symmetrically about shaft 145 a pair of bell cranks 61 and 62 (more particularly shown in FIG. 2) are mounted such that one of their corresponding ends is aligned. One end of bell crank 61 is connected by cable 63 to rod 46, and one end of bell crank 62 is connected by cable 64 to rod 47. These connections may be adjustable.

Figure 3:
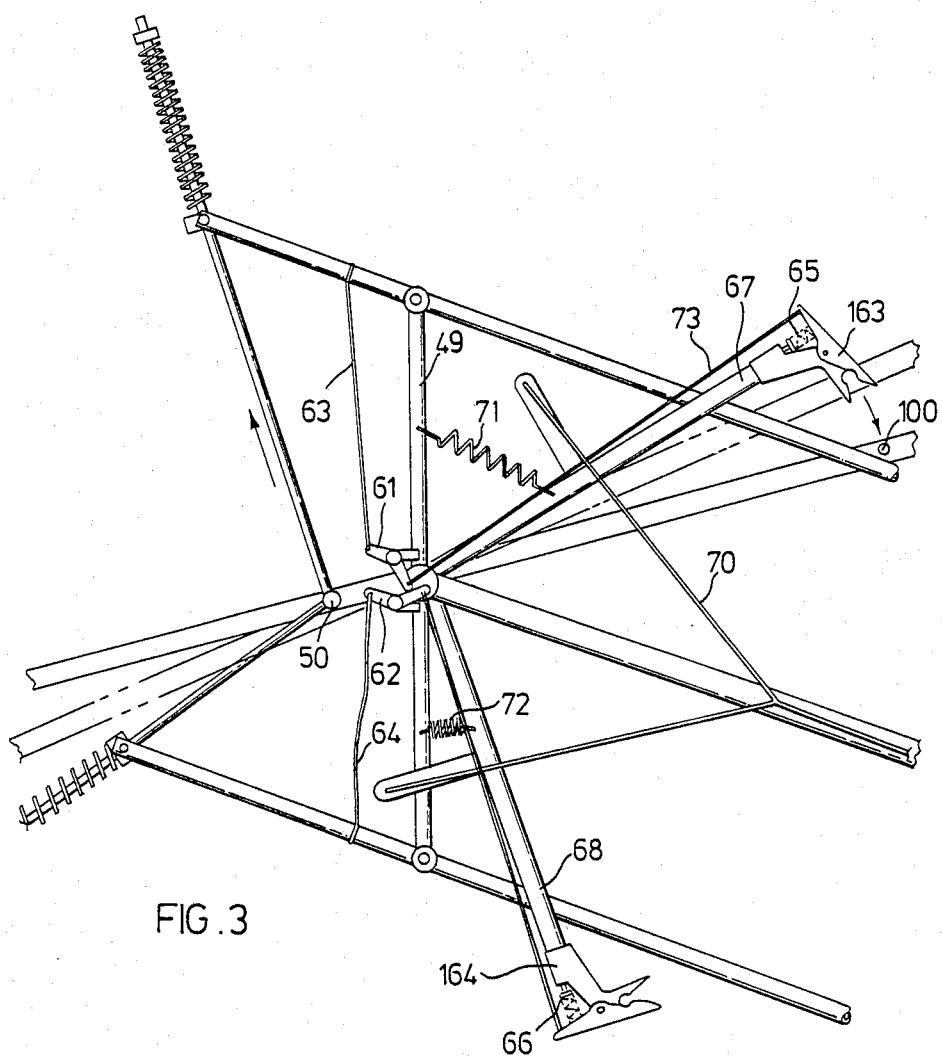
FIGS. 3 and 4 are side views of a vane and an associated vane supporting frame of the machine of FIG. 1 illustrating the relative attitudes and cooperation of the vane and its governing mechanism.

The remaining ends of bell cranks 61 and 62 are connected to jaws 163 and 164, mounted on arms 67 and 68, by cables 73 and 74. Jaws 163 and 164 are biased into a closed position by springs 65 and 66 (shown in FIGS. 2 and 3) and the attitude of arms 67 and 68 and jaws 163 and 164 is determined by a cable 70 and countersprings 71 and 72 (shown in FIGS. 1 and 3) which extend between arms 67 and 68 and rod 49.

Cable 70 is as shown symmetrically connected to arms 67 and 68 and extends rearwardly over pulleys 75 and along elongate arm 22 where it is connected to the control vane 80 mounted on an arm 81. Arm 81 is in turn pivotally mounted on elongate arm 22.

Figure 7:
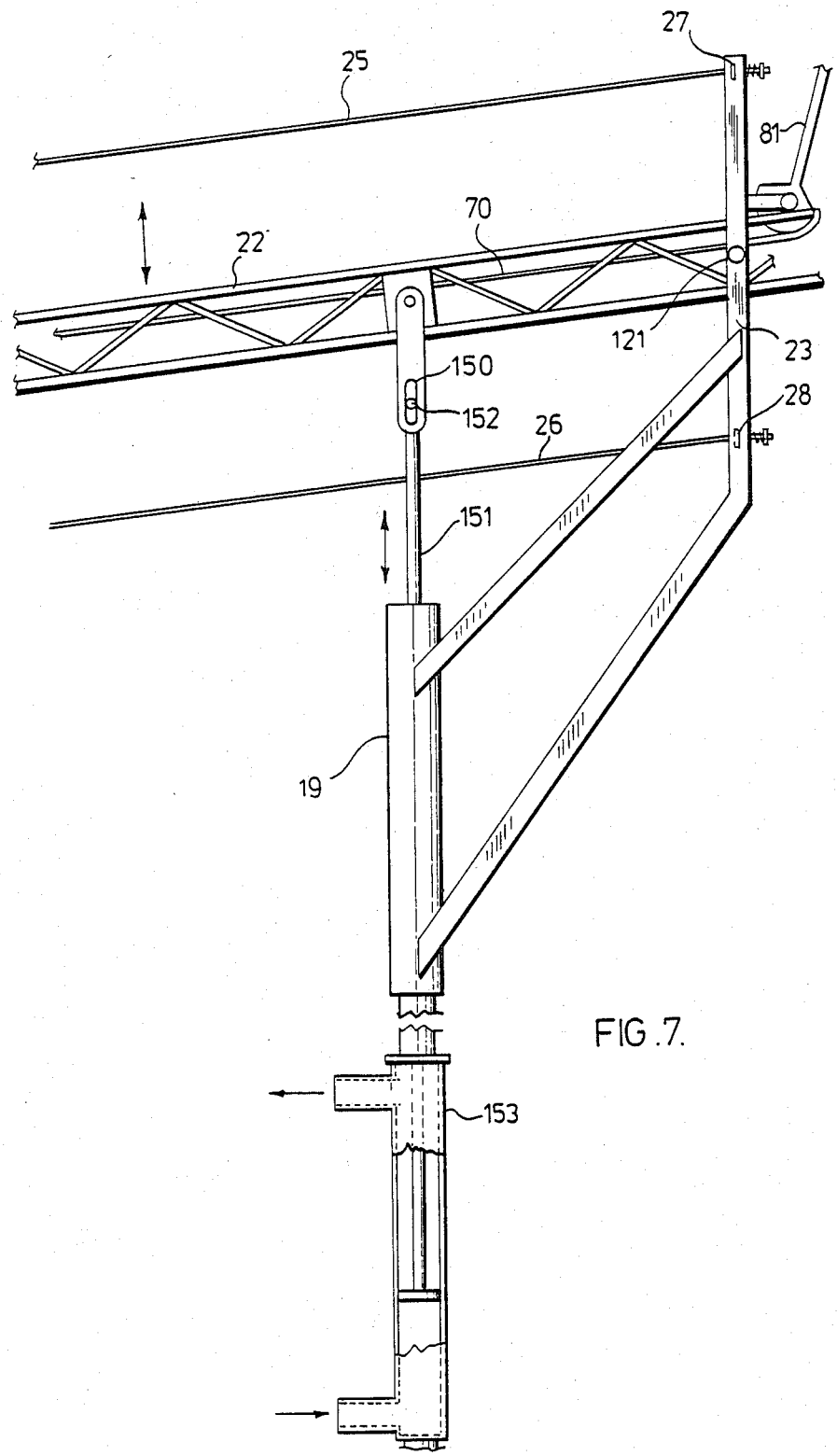
FIG. 7 is a partial enlarged side view of a vane support arm and a pump, partially in section to illustrate the operation thereof, in the machine of FIG. 1.

With further reference to FIG. 7 the upper end of a linkage arm 150 is pivotally mounted on elongate arm 22 and the lower end is pivotally connected to the upper end of a piston 151 of a vertically reciprocating pump 153.

The preferred attitude of the vane 30 is 45 degrees to the main axis of the elongate arm 22, but it will of course be understood that the efficiency due to the variation in attitude determined by the vane 80 will decrease with the wind velocity.

In operation the vanes 80 and 30 cause the main axis of elongate arm 22 to be aligned with the wind direction by rotation of the collar 19 of vane-supporting structure 21 about vertical support tube 14.

Figure 5:
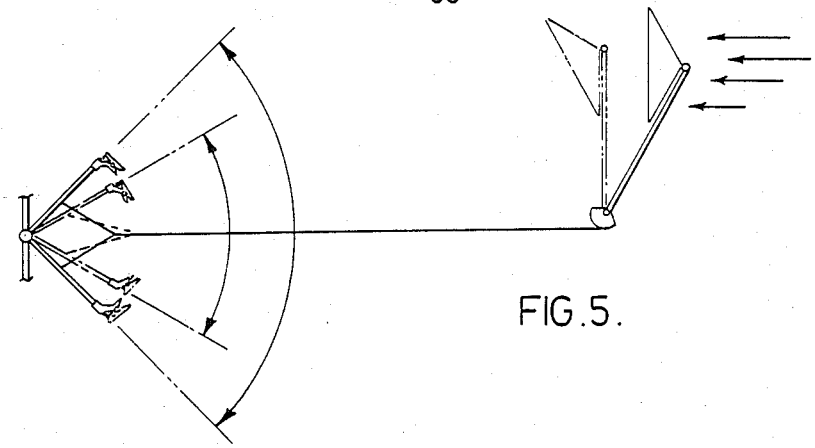
FIG. 5 is a schematic illustration of a mechanism for governing the attitude of the vane in response to the wind velocity in accordance with the present invention.
Figure 4:
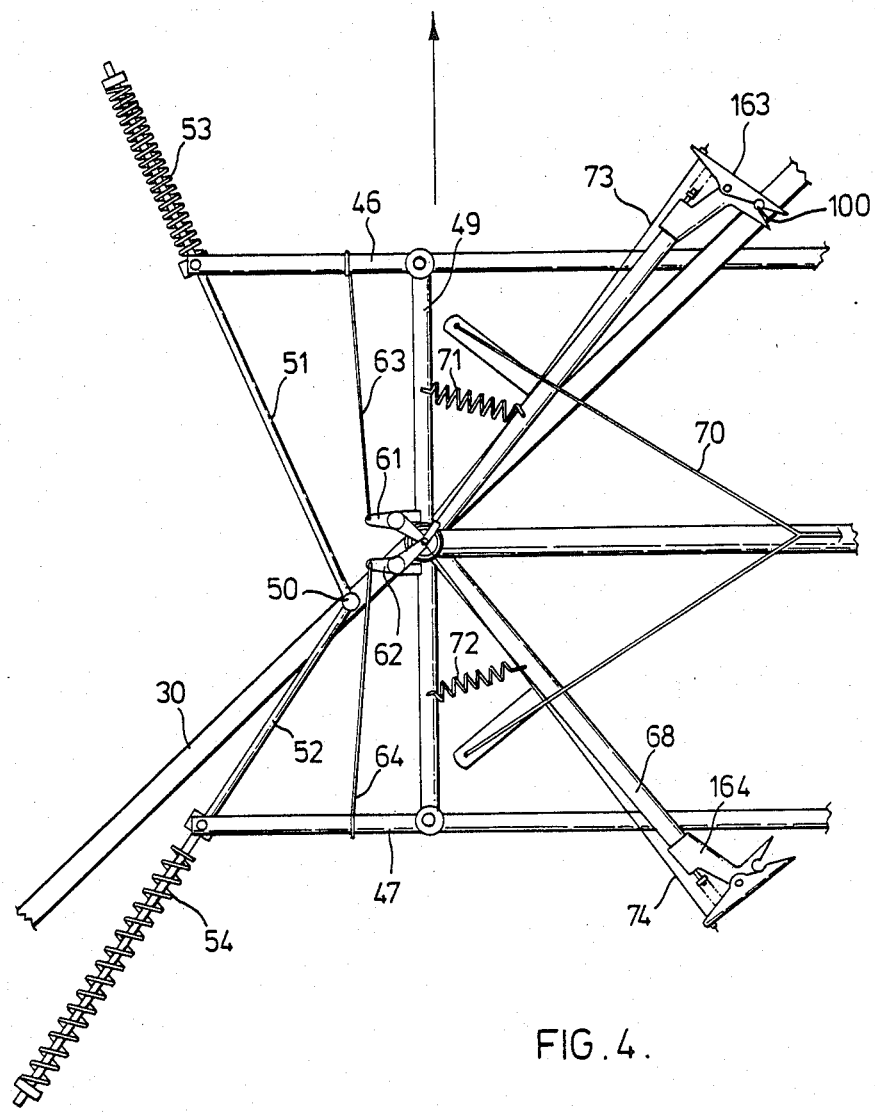

Simultaneously, vane 80 is caused to move about its axis in response to the wind velocity. As vane 80 moves forward (as illustrated in FIG. 6), it pulls cable 70 and causes jaws 163 and 164 to be pulled towards each other. This movement in turn limits the travel of vane 30 as will be evident from the description hereinafter. As the wind velocity decreases, so the attitude of the jaws 163 and 164 changes and they move further apart. This is exemplified schematically in FIG. 5.

At the same time, the attitude of the vane 30, which is initially in the horizontal position illustrated in FIG. 6, rises at its forward end in response to the force of the wind, and causes the arm 22 to pivot about arms 23 and 24, to the upper dotted outline position illustrated in FIG. 6. In this position and throughout this position the lateral fingers 100 of vane 30 are engaged by jaws 163.

When the vane 30 reaches the upper limit of its travel, jaws 163 are opened by the rotation of bell crank 61 through cables 63 and 73.

With the opening of the jaws 163, the reactions of springs 53 and 54 with their off centre bias cause the vane 30 to reverse its attitude. With the reversal in attitude, the vane 30 is forced downwardly under wind pressure to the lower attitude shown in dotted outline in FIG. 6, in which jaws 164 are engaged by fingers 100.

This motion is repeated continuously. With the resultant vertical motion of arm 22 there is, of course, a vertical reciprocation of piston 151 (shown in FIG. 7) and this in turn pumps the fluid or water through pump 153.

With the governing mechanism described the attitude of the vane 30 is responsive to the wind velocity so that the greater the wind velocity, the lesser is the angle of attack of the wind vane and the structure will float in the winds of the greatest velocity. The governing mechanism further determines the travel of piston 151.

It will be seen that the structure provided requires a much smaller surface area compared to rotating vanes, and more economical to build.

It will also be evident that the structures described are self-governing and are not restricted by the governor problems of helical windmills.

It will be understood that the tower 10 may take any suitable structural form which is capable of withstanding the stresses and performing the desired function.

The counterweight 31 may be replaced by a smaller counterbalancing vane.

With wind-power machines of the invention, a 9 square meter vane 30 on a 9 meter arm 22 will pump 100 kilos of water.

This represents considerable efficiency over a conventional rotary windmill structure. An equivalent rotary windmill, 9 sqm., requires an 80 ft. high tower to support it.

It will also be evident that as compared to the other current systems, the particular embodiment illustrated in the drawings, due to the absence of translating any rotary motion to a vertical motion, is more efficient.

It will be understood that in this description that where only one side of the structure has been described, the opposite side has a corresponding structure to that described.

It will also be understood that bearings are provided where necessary, and that corresponding mechanical, or hydraulic equivalents may be provided where obvious.

Although the present structure has been specifically described with respect to a water pump, it will be understood that it may equally well be used in other applications.

The invention has been particularly described by reference to a preferred embodiment in which arm 22 pivots with up and down motion in a vertical arc. It will be understood that the whole structure can be turned through 90° so that arm 22 is pivoted with a back and forth or to and fro movement. This is, of course, less preferred since the resulting reciprocating motion is horizontal and it is then necessary to provide for translation of the direction of motion, at least for pumping water from subterranean locations.

It will be understood that variations to the structure and to its mode of operation may be made without departing from the scope of the invention.

I claim:

1. A wind power-generating machine which comprises:
   a vane frame and at least one power vane;
   vane support means comprising an elongate truss;
   tower means for supporting said vane support means;
   power actuating means reciprocally movable in response to movement of said power vane;
   said power vane being reversibly pivotally mounted in said frame on said elongate truss adjacent a first end thereof for movement about a substantially horizontal axis through a predetermined arc;
   said elongate truss being rotatably mounted on said tower means for first movement about a horizontal axis through a predetermined arc in response to vertical movement of said power vane and in a second direction about a vertical axis in response to horizontal movement of said power vane;
   a vertical frame mounted for pivotal movement relative to said vane frame,
   said vane frame including upper and lower vane arms having spring closed jaws at their outer ends, upper and lower bell cranks connected between the upper and lower jaws, respectively, and the vertical frame;
   first spring means between said vane arms and said vertical frame and second spring means between said power vane and said vertical frame;
   stop means on said power vane adapted to engage said upper and lower jaws at the upper and lower limits, respectively, of arcuate travel of said power vane,
   said jaws being operable by rotation of their respective bell cranks at said upper and lower limits and initiating reversal of the direction of arcuate travel of the power vane through said second spring means; and
   a governor means for controlling movement of said power vane,
   said governor means comprising an arm pivotally mounted on said elongate truss, a governor vane movably mounted on said arm and a cable connecting said governor arm to said upper and lower vane arms.

2. A wind power-generating machine as claimed in claim 1, including vane-counterweight means mounted on a second end of said elongate truss.

3. A wind power-generating machine as claimed in claim 2, wherein said vane-counterweight means is a predetermined weight.

4. A wind power-generating machine as claimed in claim 2, wherein said vane-counterweight means is a second vane movable about a horizontal axis.

5. A power-generating machine as claimed in claim 4, wherein said vane support means further includes means for controlling the attitude of said vane.

6. A wind power-generating means as claimed in claim 2, wherein said governor means includes a movable governor vane and means responsive to movement of said governor vane to control the period of said vane arc and stop the machine during high winds.

7. A wind power-generating machine as claimed in claim 2, wherein said vane support means further includes means for controlling the attitude of said vane.

* * * * *